April 8, 1969    G. SEULEN ET AL    3,437,778
APPARATUS FOR INDUCTIVELY HEATING ELECTRICALLY
CONDUCTING WORKPIECES
Filed Oct. 27, 1966

Inventors
Gerhard Seulen
Axel Von Starck
By Cushman, Darby r Cushman
Attorneys

United States Patent Office 3,437,778
Patented Apr. 8, 1969

3,437,778
APPARATUS FOR INDUCTIVELY HEATING ELECTRICALLY CONDUCTING WORKPIECES
Gerhard Seulen and Axel von Starck, Remscheid, Germany, assignors to AEG—Elotherm G.m.b.H., Remscheid-Hasten, Germany
Filed Oct. 27, 1966, Ser. No. 589,888
Claims priority, application Germany, Dec. 1, 1965,
A 50,926
Int. Cl. H05b 5/08, 5/02
U.S. Cl. 219—10.71          6 Claims

ABSTRACT OF THE DISCLOSURE

An electrically conducting workpiece is inductively heated by advancing it through an inductor-produced magnetic field first extending in one direction and subsequently extending in another direction disposed at right angles to the one direction.

---

Figure 1:
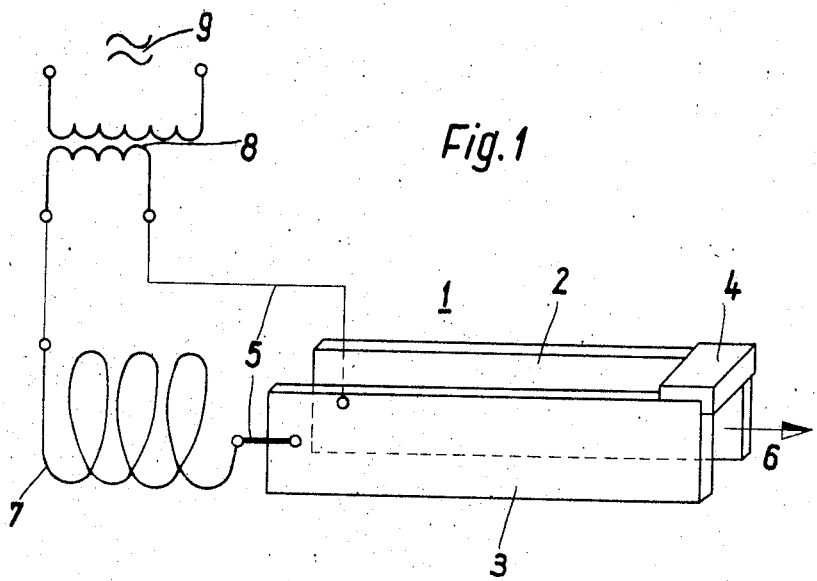

Electrically conducting workpieces, particularly steel workpieces, can be inductively heated by conveying the workpieces continuously or intermittently in consecutive steps through so-called crossfield inductors, in which the workpiece axis and the magnetic field are not codirectional but the generating field is normal to the longitudinal axis of the workpieces as they travel through the inductor.

This method of inductively heating workpieces, which is known as crossfield induction heating, is usually performed with inductors known as tunnel inductors, due to the fact that the inductors comprise two elongated limbs with a return connection at each end. Apart from these inductors, usually referred to as true tunnel inductors, there are others which have a return connection at only one end. True and modified tunnel inductors may comprise one or several turns. When there is only one turn it is generally necessary to connect them to a supply of normal frequency or higher frequency current through a transformer.

Inductors which generate a crossfield (crossfield inductors) differ in their electrical behaviour from inductors which generate an axial field (axial field inductors). When cold steel workpieces are heated in axial field inductors the latter, at temperatures below the Curie point, consume extremely high power when the voltage is constant. Their power consumption falls considerably as soon as the temperature has risen above the Curie point. On the other hand, when heating a steel workpiece in a crossfield inductor power consumption is substantially the same when the workpiece is cold and when it is hot. Power consumption when the workpiece is hot may even exceed the power consumed when the workpiece is cold. This behaviour of crossfield inductors is an advantage insofar as it permits induction heating equipment to be started at full load even if the workpieces are initially cold. Consequently, should there be a stoppage in the following processing machines, such induction heating equipment can be started up again at any desired temperature without overloading the supply mains.

Crossfield heating has, however, a disadvantage which appears when it is desired to heat the workpieces to a uniform temperature throughout their cross section to the core, as is necessary for example when the workpieces are to be subjected to a following hot shaping process. For the same electrical data and workpieces of the same size, complete heating takes longer to complete in crossfield inductors than in inductors generating an axial field, for example between 1.5 to 3 times as long.

This militates against effective design and layout of plant, because it means that either the length of the heating channel for the same rate of throughput must be considerably longer than when using an axial field inductor, or several heating channels must be provided side by side and operated simultaneously. The equipment thus occupies more floor space and the thermal efficiency is lower because the larger equipment dissipates more heat. Finally, the lengthening of the heating channels to achieve the same rate of throughput encourages the formation of scale on the workpiece surfaces. Nevertheless, the use of crossfield inductors for inductively heating metal workpieces is desirable because in such inductors the lateral limbs of the inductor can be easily adjusted to workpieces of different sizes.

It is the object of the invention to provide apparatus which permits the advantages of both methods of heating to be secured without incurring any of their respective disadvantages.

The invention consists of means for inductively heating an electrically conducting workpiece, which advances continuously or intermittently through an inducing magnetic field, in which the relative orientation of the workpiece to the said inducing magnetic field changes by 90° at a point along the path of the travelling workpiece where the workpiece has reached a temperature between 30 and 60% of the desired final temperature. If a steel workpiece is being heated, this point may be at a temperature within the range of the Curie point of the steel.

A particularly useful procedure comprises first exposing the workpiece to a magnetic field which extends in the longitudinal workpiece axis and then to a field normal to the said longitudinal axis.

This technique results in a rapid rise of the surface temperature of the workpiece in the axial field in the lower temperature range. With workpieces consisting of a ferritic steel the workpiece surfaces can thus be relatively quickly raised to a temperature slightly above the Curie point within a short distance of travel. The workpiece in this condition having a core which is still cold, or which has not yet reached a high temperature, then enters the crossfield, heating thus continuing with a relatively lower power density, permitting the considerable temperature differences across the section of the workpiece to equalise and a uniform temperature distribution into the core to be achieved.

The apparatus proposed by the present invention can be readily adapted to the varying requirements which arise in the heating of workpieces. For carrying out the invention, a tunnel inductor may for instance be provided, and suitable arrangements made for the workpieces to be conducted through the inductor first with their longitudinal axis vertically upright, and then for the upright workpieces to be tipped over as they enter the second section of the tunnel inductor so that their longitudinal axis then aligns with their direction of travel. However, the method of changing the direction of the inducing magnetic fields as the workpiece travels through the inductor by changing the attitude of the workpiece does offer some difficulties, and preferred apparatus for carrying out the invention comprises a conventional helical inductor coil which axially embraces the path of the workpieces in the first stage followed by a single or multiple turn plate-type inductor in the second stage. From electrical considerations, series operation is to be preferred. An alternative arrangement consists in providing at the entry end of the single or multiple turn plate-type inductor in place of an inductor coil, a single or multiple turn plate-type inductor placed with its axis at an angle of about 90° to the following plate-type inductor.

Figure 2:
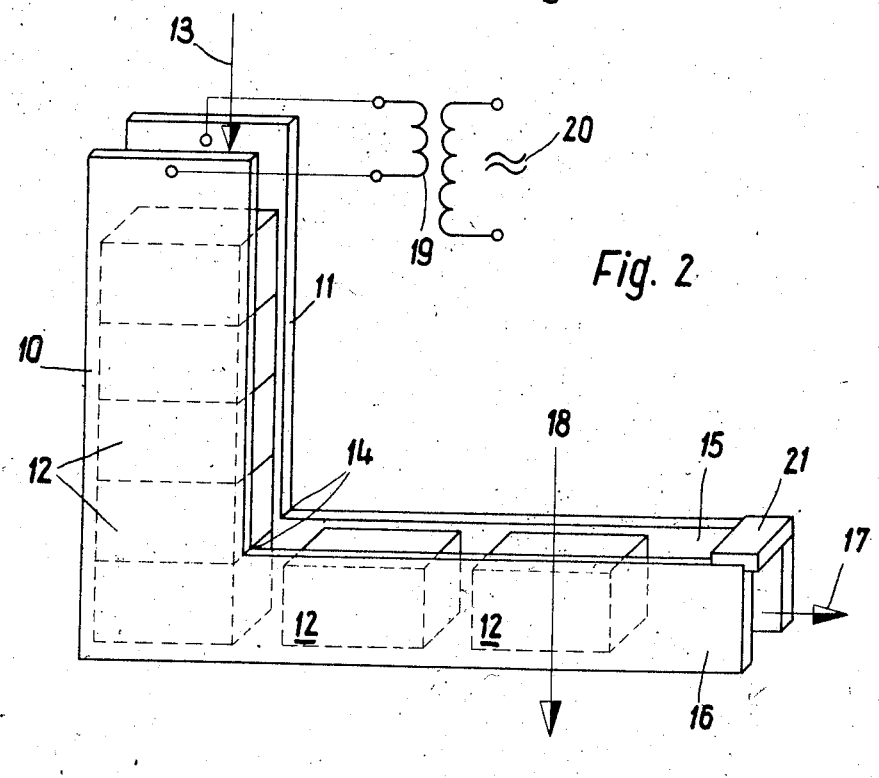

These two latter embodiments are diagrammatically illustrated in the accompanying drawing, of which FIGURE 1 and FIGURE 2 are schematic representations of the inductors with associated circuits. Referring to FIGURE 1, a plate-type inductor 1 formed by two single turn inductor plates 2 and 3, has a return bridge at 4. This inductor which is fed through cables 5 is a crossfield inductor extending along the path of travel of the workpieces. The crossfield inductor is preceded by a coil 7 (axial field inductor) which embraces the path of the workpieces. This coil is preferably electrically connected in series with the plate-type inductor 1, both inductors being fed through a transformer 8 from an A.C. supply 9. In principle the inductors may be operated at any desired frequency, preferably at a medium frequency. The A.C. supply may be derived from conventional A.C. power mains or from a rotary converter, a magnetic frequency multiplier or an inverter using controlled rectifiers or transistors or a static frequency changer.

The workpiece first travels axially through the axial field inductor 7 wherein its surface temperature is raised. In the crossfield inductor 1 the workpiece is further heated so that its temperature is uniform to the core.

An inductor constructed as illustrated in FIGURE 1 can be easily adapted for heating workpieces of different sizes, the internal diameter of the axial field inductor 7 being so chosen that it can accommodate workpieces of the largest contemplated cross section. Since the said largest steel workpieces will be heated to within the ferritic region whilst they are in the coil 7, smaller section workpieces will also be suitably heated and that the efficiency of the preliminary inductor will be sufficiently high. In the crossfield inductor 1 the plates 2 and 3 can be adjusted to the dimensions of the workpieces by moving them sideways to the required spacing. Further, the effective length of the inductor plates 2 and 3 can be readily changed to comply with existing requirements by moving the return bridge 4.

For heating a case-hardenable steel, as is necessary for making parts for motor vehicle transmissions, it has been found that the ratio of the length of the crossfield inductor to that of the axial field inductor should be about 2 to 1.

FIGURE 2 of the accompanying drawing illustrates the manner in which axial field and a crossfield heating can be combined by using two single turn plate-type inductors 10–11 and 15–16. The workpieces 12 are introduced in the vertical direction of arrow 13 in such manner that the two inductor plates 10 and 11 first submit the workpieces to axial field heating. At 14 the two inductor plates form a right angle, and continue in the horizontal direction to form two limbs 15 and 16 between which the workpieces are conveyed in the direction of arrow 17. Between these two inductor plates 15 and 16 the workpieces 12 are therefore exposed to a crossfield directed as indicated by arrow 18.

The two inductor halves are fed through a transformer 19 from an A.C. source of current 20. 21 is the return bridge at the end of the two inductor plates.

The magnetic fields experienced by the workpieces in this arrangement automatically change direction because the workpieces 13 first travel from the top downwardly, and then from the vertex 14 of the right angle horizontally, without changing their attitude. The inductor plates 10–16 and 11–15 can be moved closer together or spaced more widely apart and thus be readily adjustable to the size of the workpiece.

In the embodiments according both to FIGURE 1 and FIGURE 2, modifications may be incorporated within the scope of the invention. Thus instead of using single turn crossfield and/or axial field inductor limbs, multiple turn plate-type inductors could be used. The inductors may be fitted with magnetic yokes of sheet metal or ferritic materials, as is usual. Moreover, the plates may be cooled by attaching tubes thereon carrying a coolant to them.

The crossfield can be generated by a coil inductor instead of a plate-type inductor, the workpieces being conveyed through the coil with their longitudinal axis normal to the axis of the coil.

What is claimed is:

1. Induction heating equipment for heating workpieces having at least a first axis comprising first means for producing a first heating magnetic field in a first direction, and second means for producing a second heating magnetic field in a direction 90° to the said first direction, and conveying means for conveying workpieces from the said first magnetic field to the second magnetic field, wherein the said first and second means comprise first and second facing plate-type inductors for first producing said first heating magnetic field codirectional with a first axis of the workpiece, and subsequently for producing said second heating magnetic field normal to the said first axis of the workpiece.

2. Induction heating equipment comprising first means for producing a first heating magnetic field in a first direction, and second means for producing a second heating magnetic field in a direction 90° to the said first direction, and conveying means for conveying workpieces from the said first magnetic field to the second magnetic field, wherein at least the said second means comprises an elongate plate-type inductor embracing the path of travel of the workpieces, and wherein the said first direction is parallel to the longitudinal direction of the said elongate plate-type inductor.

3. Induction heating equipment as claimed in claim 2, in which the first means comprises an induction coil embracing the path of travel of the workpiece, and the second means comprises a plate-type inductor of at least one turn, said inductor embracing the path of travel of the workpiece.

4. Induction heating equipment as claimed in claim 3, in which the said induction coil axially precedes the said plate-type inductor.

5. Induction heating equipment as claimed in claim 3 in which the said induction coil and the said plate-type inductor are electrically connected in series.

6. Induction heating equipment as claimed in claim 2, in which the first and second means comprise two axially succeeding plate-type inductors each of at least one turn, the leading inductor placed with its axis at an angle of 90° with respect to the following inductor.

References Cited

UNITED STATES PATENTS

| 2,448,011 | 8/1948 | Baker et al. | 219—10.71 X |
| 2,465,306 | 3/1949 | Durand | 219—10.71 X |
| 2,647,982 | 8/1953 | Baker | 219—10.71 X |
| 2,669,647 | 2/1954 | Segsworth | 219—10.71 |
| 3,056,876 | 10/1962 | Schmidt | 219—10.71 X |
| 3,272,956 | 9/1966 | Baermann | 219—10.61 |

FOREIGN PATENTS

| 809,759 | 3/1959 | Great Britain. |
| 917,198 | 7/1954 | Germany. |

RICHARD M. WOOD, *Primary Examiner.*

L. H. BENDER, *Assistant Examiner.*

U.S. Cl. X.R.

219—10.61, 10.79